(12) United States Patent
Agnew et al.

(10) Patent No.: US 8,043,576 B2
(45) Date of Patent: Oct. 25, 2011

(54) REFORMER MODULE

(75) Inventors: Gerard D Agnew, Derby (GB); Robert H Cunningham, Derby (GB); Philip D Butler, Derby (GB); Robert D Collins, Derby (GB)

(73) Assignee: Rolls-Royce plc, London, England ( * ) Notice: Subject to any disclaimer, the term of this patent is extended or adjusted under 35 U.S.C. 154(b) by 124 days.

(21) Appl. No.: 12/689,469

(22) Filed: Jan. 19, 2010

(65) Prior Publication Data

US 2010/0135872 A1 Jun. 3, 2010

Related U.S. Application Data

(60) Division of application No. 11/312,378, filed on Dec. 21, 2005, now Pat. No. 7,749,465, which is a continuation of application No. PCT/GB2004/002811, filed on Jun. 30, 2004.

(30) Foreign Application Priority Data

Jul. 26, 2003 (GB) .................................. 0317575.9

(51) Int. Cl.
*B01J 8/02* (2006.01)
(52) U.S. Cl. ........ 422/211; 422/222; 422/213; 423/650; 423/652; 423/648.1; 48/61; 502/527.12
(58) Field of Classification Search .................. 422/213, 422/211, 222; 423/648.1, 650; 48/61; 502/527.12
See application file for complete search history.

(56) References Cited

U.S. PATENT DOCUMENTS

| 6,143,159 A | 11/2000 | Bloomfield |
| 6,180,081 B1 | 1/2001 | Poschmann |
| 6,284,398 B1 | 9/2001 | Kiryu |
| 2002/0000067 A1 | 1/2002 | Numata |
| 2002/0009407 A1 | 1/2002 | Kourtakis |
| 2002/0071790 A1 | 6/2002 | Woods |
| 2004/0076562 A1 | 4/2004 | Manzanec |

FOREIGN PATENT DOCUMENTS

| EP | 0435642 A2 | 7/1991 |
| EP | 0920064 A1 | 6/1999 |
| EP | 1065741 A2 | 1/2001 |
| JP | 3012302 A | 1/1991 |
| JP | 6157004 A | 6/1994 |
| JP | 9129256 A | 5/1997 |
| WO | 03010847 A2 | 2/2003 |

OTHER PUBLICATIONS

European Search Report and International Search Report.
This application is a Divisional of U.S. Appl. No. 11/312,378, filed Dec. 21, 2005.

*Primary Examiner* — Kaity V. Handal
(74) *Attorney, Agent, or Firm* — Jeffrey S. Melcher; Manelli Selter PLLC

(57) ABSTRACT

A reformer module (10) comprises a hollow support member (12) having at least one passage (14) extending longitudinally therethrough. The hollow support member (14) has an external surface (20), a barrier layer (22) arranged on at least a portion of the external surface (20) of the hollow support member (12), a catalyst layer (24) arranged on the barrier layer (22) and a sealing layer (26) arranged on the catalyst layer (24) and the external surface (20) of the hollow support member (12) other than the at least a portion of the external surface of the hollow support member (12). By providing the barrier layer (22) and the catalyst layer (24) on the exterior surface (20) of the hollow support member (12), the distribution of the barrier layer (22) and/or the catalyst layer (24) may be more precisely controlled and thus a non-uniform distribution of barrier layer (22) and/or catalyst layer (24) may be achieved.

5 Claims, 3 Drawing Sheets

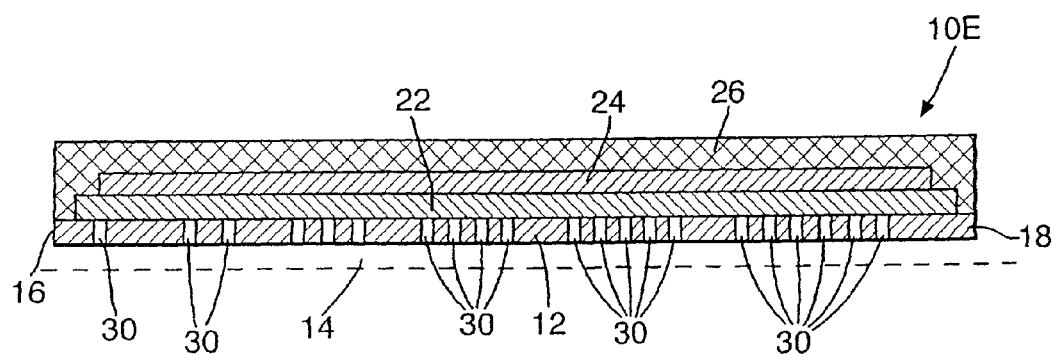
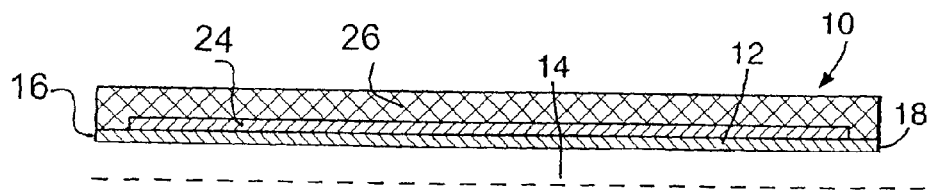

REFORMER MODULE

This is a divisional of U.S. patent application Ser. No. 11/312,378, filed 21 Dec. 2005 and currently U.S. Pat. No. 7,749,465, which is a continuation of International Application Number PCT/GB2004/002811, filed 30 Jun. 2004 and designating the United States, which claims priority of GB 0317575.9, filed 26 Jul. 2003.

BACKGROUND OF THE INVENTION

The present invention relates to a reformer module for a fuel cell system and in particular to a reformer for a solid oxide fuel cell system.

Methane steam reforming is a highly endothermic reaction and results in localised cooling in the reformer unit.

At the temperatures used for steam reforming in a solid oxide fuel cell the kinetics of the steam reforming reaction are extremely rapid. A problem with indirect internal steam reforming in a solid oxide fuel cell is the mismatch between the activity of the steam reforming catalyst and the heat available from the solid oxide fuel cells. As a result a large temperature gradient may be produced along the length of the reformer unit.

This problem may be reduced by using only a small fraction of the available catalyst activity. This may be achieved practically by providing a non-uniform distribution of the catalyst or by providing a diffusion barrier on the surface of the catalyst. Traditionally a catalyst layer is provided on the outer surface of a pellet and a barrier layer is provided on the catalyst layer or a catalyst slurry layer is provided on the interior surface of a hollow support and a barrier layer is provided on the catalyst layer. In both these cases the application of a catalyst or a barrier layer is extremely difficult due to the uneven nature of the surface of the pellet and hollow support and in the case of the hollow support it is extremely difficult to coat the interior surface of the hollow support. Furthermore, the non-uniform distribution of the catalyst layer is also extremely difficult in both these cases.

SUMMARY OF THE INVENTION

Accordingly the present invention seeks to provide a novel reformer module, which reduces, preferably overcomes, the above-mentioned problems.

Accordingly the present invention provides a reformer module comprising a hollow support member having at least one passage extending longitudinally therethrough, means to supply a fuel to the at least one passage, the hollow support member having an external surface, a reforming catalyst layer arranged on at least a portion of the external surface of the hollow support member and a gas tight sealing layer arranged on the catalyst layer and the external surface of the hollow support member other than the at least a portion of the external surface of the hollow support member.

Preferably a barrier layer is arranged on the at least a portion of the external surface of the hollow support member and the catalyst layer is arranged on the barrier layer.

Preferably the barrier layer is arranged on substantially the whole of the external surface of the hollow support member.

Preferably a catalyst layer is arranged on the barrier layer at each of a plurality of regions of the external surface of the hollow support member, the sealing layer is arranged on the catalyst layer at each of the regions of the external surface of the hollow support member having a catalyst layer and on the barrier layer and the hollow support member at regions of the external surface of the hollow support member other than the plurality of regions.

The catalyst layers at the plurality of regions may be spaced apart longitudinally of the hollow support member. The catalyst layers at the regions may have different areas. The catalyst layers at the plurality of regions may increase in area longitudinally from a first end to a second end of the hollow support member.

Alternatively the catalyst layer may be arranged on substantially the whole of the barrier layer, the barrier layer has a different thickness at different regions. The barrier layer may decrease in thickness from a first end to a second end of the hollow support member.

Alternatively the barrier layer may have apertures therethrough and the total cross-sectional area of the apertures in the barrier layer is different at different regions. The total cross-sectional area of the apertures in the barrier layer at the different regions may increase from a first end to a second end of the hollow support member. The dimensions of the apertures may increase and/or the number of apertures may increase.

Alternatively the catalyst layer has a different activity at different regions. The catalyst layers at the different regions may increase in activity from a first end to a second end of the hollow support member.

Preferably the first end is an inlet for a hydrocarbon fuel to be reformed and the second end is an outlet for reformed fuel.

Preferably the hollow support member comprises a plurality of longitudinally extending passages.

Preferably the hollow support member is porous.

Alternatively the hollow support member is non-porous and has a plurality of apertures extending therethrough.

The total cross-sectional area of the apertures in the hollow non-porous support member may be different at different regions.

The total cross-sectional area of the apertures in the hollow non-porous support member at the different regions may increase from a first end to a second end of the hollow support member. The dimensions of the apertures may increase and/or the number of apertures may increase.

BRIEF DESCRIPTION OF THE DRAWINGS

The present invention will be more fully described by way of example with reference to the accompanying drawings in which:

FIG. 8 is another alternative enlarged cross-sectional view transversely through the reformer module shown in FIG. 1.

FIG. 9 is a cross-sectional view transversely through the reformer module according to the present invention.

DETAILED DESCRIPTION OF THE INVENTION

Figure 1:
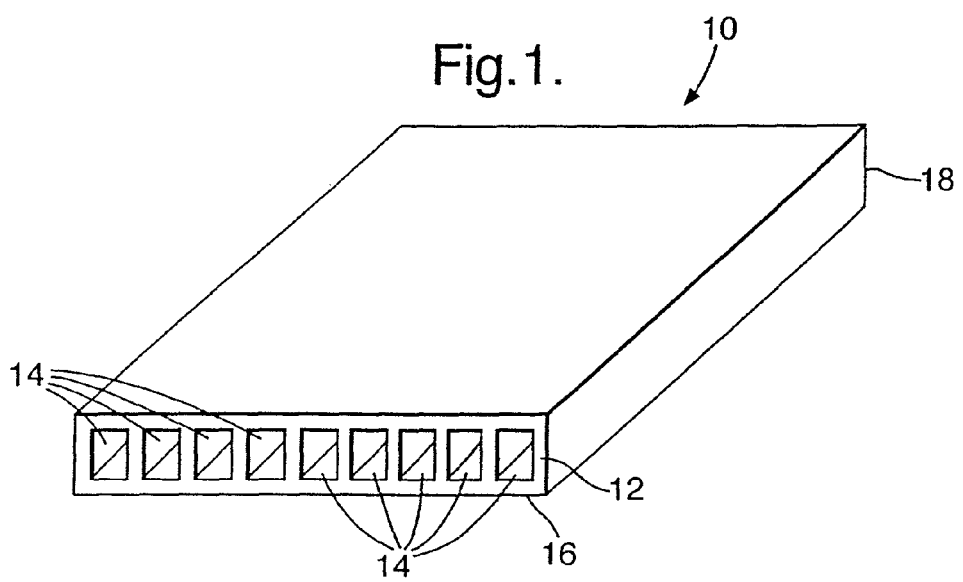
FIG. 1 is a perspective view of a reformer module according to the present invention.
Figure 2:
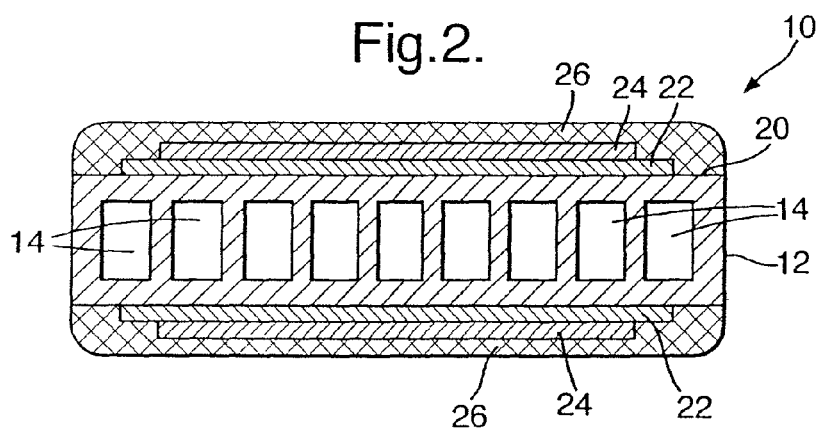
FIG. 2 is an enlarged cross-sectional view transversely through the reformer module shown in FIG. 1.
Figure 3:
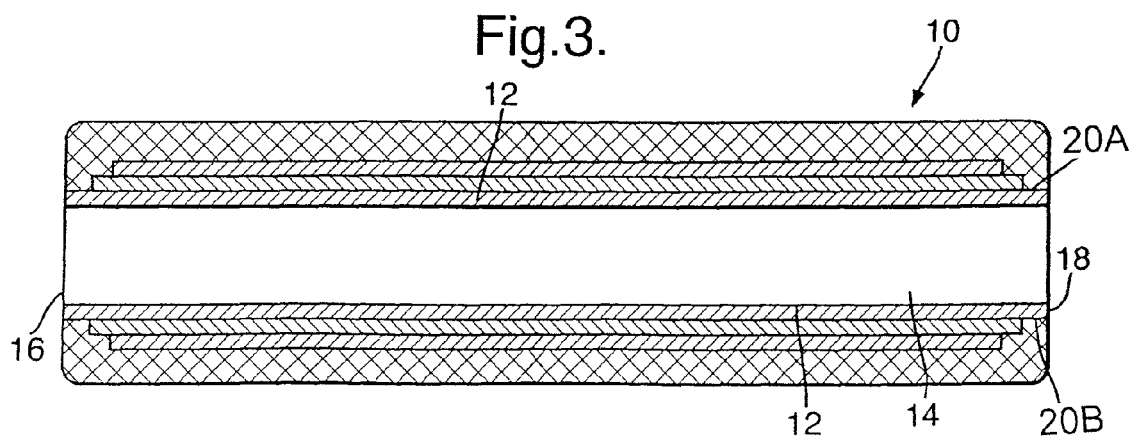
FIG. 3 is an enlarged cross-sectional view longitudinally view through the reformer module shown in FIG. 1.

A reformer module 10, as shown in FIGS. 1, 2 and 3 comprises a hollow porous support member 12 which has a plurality of passages 14 extending longitudinally therethrough from a first end 16 to a second end 18. The hollow porous support member 12 has an external surface 20 and a porous barrier layer 22 is arranged on substantially the whole of the external surface 20 of the hollow porous support member 12. A catalyst layer 24 is arranged on substantially the whole of the porous barrier layer 22 and a sealing layer 26 is arranged on the catalyst layer 24, on any of the porous barrier layer 22 not covered by the catalyst layer 24 and the external surface 20 of the hollow porous support member 12 other than portion covered by the porous barrier layer 22.

It is to be noted that the hollow porous support member 12 has two substantially flat parallel external surfaces 20A and 20B, as shown in FIG. 3, and that the porous barrier layer 22, catalyst layer 24 and sealing layer 26 are applied to both external surfaces 20A and 20B.

The porous barrier layer 22 is a diffusion barrier layer to control the rate of diffusion of the hydrocarbon fuel from the passages 14 to the catalyst layer 24. The hollow porous support member 12 comprises for example magnesium aluminate spinel, yttria stabilised zirconia, silicon carbide or other suitable ceramic. The porous barrier layer 22 comprises for example yttria-stabilised zirconia. The catalyst layer 24 comprises for example rhodium, nickel or other suitable reforming catalyst and preferably comprises about 1 wt % of the catalyst material dispersed in a suitable material, for example yttria-stabilised zirconia. The sealing layer 26 is gas tight and comprises for example a glass or dense non-porous yttria-stabilised zirconia.

The porous barrier layer 22 and the catalyst layer 24 may be deposited by screen-printing, ink-jet printing, brush painting, dipping or slurry coating.

In operation a hydrocarbon fuel, for example methane, is supplied to the first end 16 of the reformer module 10. The hydrocarbon fuel flows through the passages 14 from the first end 16 to the second end 18 of the reformer module 10. The hydrocarbon fuel diffuses through the hollow porous support member 12 and through the porous barrier layer 22 to the catalyst layer 24. The hydrocarbon fuel is reformed in the catalyst layer 24 and the products of the reforming reaction, hydrogen, carbon monoxide, carbon dioxide etc diffuse through the porous barrier layer 22 and the hollow porous support member 12 to the passages 14. The products of the reforming reaction flow through the passage 14 and out of the second end 18 of the reformer module 10 and are supplied to a solid oxide fuel cell system (not shown).

Figure 4:
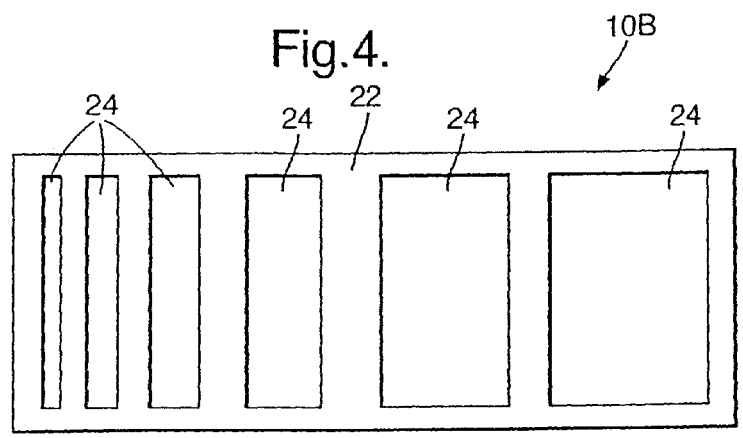
FIG. 4 is a plan view of the catalyst layer of a reformer module according to the present invention.
Figure 5:
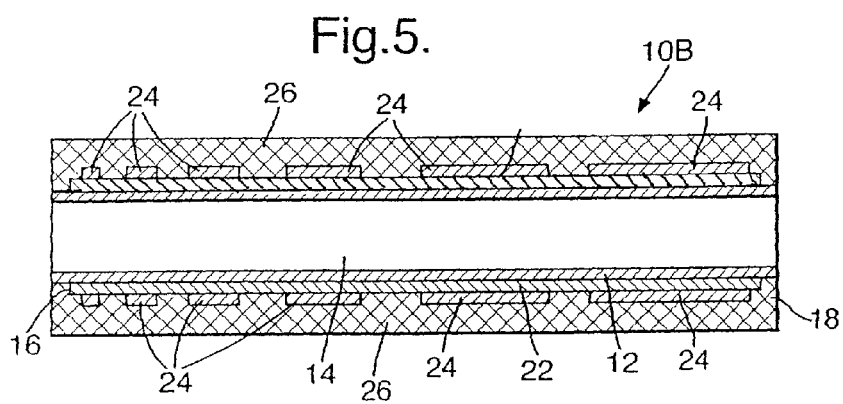
FIG. 5 is a longitudinal cross-sectional view through the reformer module shown in FIG. 4.

A further embodiment of a reformer module 10B according to the present invention is shown in FIGS. 4 and 5. The reformer module 10B is substantially the same as that shown in FIGS. 1 to 3 and like parts are denoted by like numerals. In this embodiment the catalyst layer 24 does not cover the whole of the porous barrier layer 22 but rather catalyst layers 24 are provided at a plurality of regions spaced apart longitudinally along the reformer module 10B. It is to be noted that the areas of contact between the catalyst layers 24 and the porous barrier layer 22 progressively increases from the first end 16 to the second end 18 of the reformer module 10B. This is to control the reaction rate of the reforming reaction in the catalyst layer 24 longitudinally along the reformer module 10B, by ensuring there is less catalyst at the first end 16 than at the second end 18 of the reformer module 10B and progressively increasing the amount of catalyst between the first end 16 and the second end 18 of the reformer module 10B, such that the temperature gradients longitudinally along the reformer module 10B are reduced or minimised.

Figure 6:
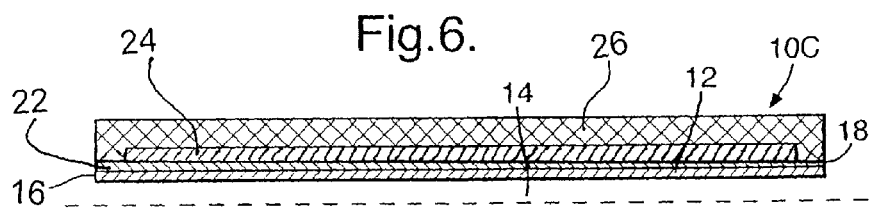
FIG. 6 is an alternative enlarged cross-sectional view transversely through the reformer module shown in FIG. 1.

Another embodiment of a reformer module 10C according to the present invention is shown in FIG. 6. The reformer module 10C is substantially the same as that shown in FIGS. 1 to 3 and like parts are denoted by like numerals. In this embodiment the porous barrier layer 22 decreases in thickness from the first end 16 to the second end 18 of the reformer module 10C. This is to control the reaction rate of the reforming reaction in the catalyst layer 24 longitudinally along the reformer module 10C, by ensuring there is a thicker barrier layer 22 at the first end 16 than the second end 18 so that diffusion through the porous barrier layer 22 is quicker at the second end 18 than at the first end 16, such that the temperature gradients longitudinally along the reformer module 10C are reduced or minimised.

The porous barrier layer 22 may decrease in thickness in a stepped manner rather than by a continuous decrease in thickness. The porous barrier layer 22 may be produced by initially dipping substantially the full length of the hollow porous support member 12 into a tank containing the barrier layer material, yttria stabilised zirconia, so that the whole of the external surface of the hollow porous support member 12 is covered by the porous barrier layer 22. Then the hollow porous support member 12 is dipped sequentially into the tank containing the barrier layer material, yttria stabilised zirconia, by progressively shorter distances so that less and less of the length of the hollow porous support member 12 is covered by the porous barrier layer 22 to produce the stepped change in thickness of the porous barrier layer 22.

A further alternative is to dip the hollow porous support member 12 sequentially into tanks containing barrier layer materials with different compositions.

Figure 7:
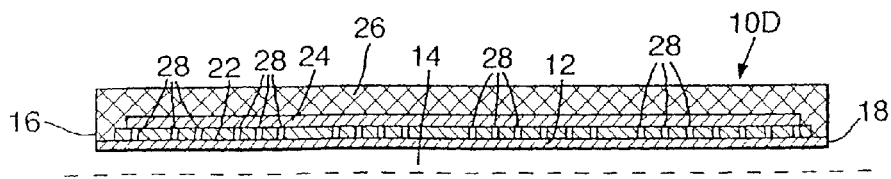
FIG. 7 is a further alternative enlarged cross-sectional view transversely through the reformer module shown in FIG. 1.

A further embodiment of a reformer module 10D according to the present invention is shown in FIG. 7. The reformer module 10D is substantially the same as that shown in FIGS. 1 to 3 and like parts are denoted by like numerals. In this embodiment a non-porous barrier layer 22 has apertures 28 extending therethrough and the number of apertures 28 and/or the dimensions of the apertures 28 changes from the first end 16 to the second end 18 such that the total area of the apertures 28 at the first end 16 is less than the total area of the apertures 28 at the second end 18 and the total area for the apertures 28 increases from the first end 16 to the second end 18 of the reformer module 10D. Again this is to control the reaction rate of the reforming reaction in the catalyst layer 24 longitudinally along the reformer module 10D, so that diffusion through the barrier layer 22 is quicker at the second end 18 than the first end 16, such that the temperature gradients longitudinally along the reformer module 10D are reduced or minimised.

Alternatively the catalyst layer 24 may have a lesser activity at the first end 16 than the second end 18 of the reformer module 10.

A further embodiment of a reformer module 10E according to the present invention is shown in FIG. 8. The reformer module 10E is substantially the same as that shown in FIGS. 1 to 3 and like parts are denoted by like numerals. In this embodiment a non-porous hollow support member 12 has apertures 30 extending therethrough and the number of apertures 30 and/or the dimensions of the apertures 30 changes from the first end 16 to the second end 18 such that the total area of the apertures 30 at the first end 16 is less than the total area of the apertures at the second end 18 and the total area for the apertures 30 increases from the first end 16 to the second end 18 of the reformer module 10E. There is a porous barrier layer 22. Again this is to control the reaction rate of the reforming reaction in the catalyst layer 24 longitudinally along the reformer module 10E, so that diffusion through the barrier layer 22 is quicker at the second end 18 than the first end 16, such that the temperature gradients longitudinally along the reformer module 10E are reduced or minimised. The non-porous hollow support member 12 preferably comprises alumina, but may comprise dense non-porous magnesium aluminate spinel, dense non-porous yttria stabilised zirconia, dense non-porous silicon carbide etc. An alumina hollow support member is stronger.

It may be possible to dispense with the barrier layer in some circumstances for example in FIG. 8.

The advantages of the present invention are that by providing the catalyst layer on the exterior surface of the hollow support member, the distribution of the catalyst may be more precisely controlled and thus a non-uniform distribution of catalyst may be achieved. Furthermore, a barrier layer may also be provided more easily between the hollow support member and the catalyst layer, the distribution of the barrier layer may be more precisely controlled and thus a non-uniform distribution of the barrier layer may be achieved. The exterior surfaces of the hollow support member may be maintained uniform and flat, facilitating an even and continuous deposited layer. Also the layers may be more easily inspected for flaws, cracks and thickness etc. There is only the sealing layer to provide between the external surroundings, which provide the heat for the reforming reaction, and the catalyst layer where the reforming reaction occurs and this provides a low thermal barrier to the transfer of heat to the catalyst layer.

As a further possibility the reformer module may itself form a part of the solid oxide fuel stack as described in published International patent application WO03010847A published 6 Feb. 2003. In that case a portion of one or both of the external surfaces of the reformer module has a barrier layer, a catalyst layer and a sealing layer and the remainder of one or both of the external surfaces may also have one or more solid oxide fuel cells.

Although the present invention has been described with reference to use with solid oxide fuel cells, it may be equally possible to use the present invention with other fuel cells and generally for steam reforming or catalytic combustion.

The invention claimed is:

1. A reformer module comprising:
   a hollow support member having at least one passage extending longitudinally therethrough and having an external surface, wherein said hollow support member is non-porous and has a plurality of apertures extending therethrough;
   means to supply a fuel to be reformed to the at least one passage;
   a catalyst layer arranged on at least a portion of the external surface; and
   a gas tight sealing layer arranged on the catalyst layer and on a portion of the external surface not covered by the catalyst layer.

2. A reformer module as claimed in claim 1 wherein the total cross-sectional area of the apertures in the hollow non-porous support member is different at different regions.

3. A reformer module as claimed in claim 2 wherein the total cross-sectional area of the apertures in the hollow non-porous support member at the different regions increases from a first end to a second end of the hollow support member.

4. A reformer module as claimed in claim 3 wherein the dimensions of the apertures increase and/or the number of apertures increase.

5. A reformer module comprising:
   a hollow support member having at least one passage extending longitudinally therethrough and having an external surface, wherein said hollow support member is non-porous and has a plurality of apertures extending therethrough;
   means to supply a fuel to be reformed to the at least one passage;
   a barrier layer arranged on at least a portion of the external surface;
   a catalyst layer arranged on the barrier layer; and
   a gas tight sealing layer arranged on the catalyst layer, on a portion of the barrier layer not covered by catalyst layer, and on a portion of the external surface not covered by the barrier layer.

\* \* \* \* \*